US008082520B2

(12) United States Patent
Davis et al.

(10) Patent No.: US 8,082,520 B2
(45) Date of Patent: Dec. 20, 2011

(54) SYSTEM AND METHOD FOR DATABASE MANAGEMENT

(75) Inventors: Jeffrey Michael Davis, Rochester, MN (US); Randy Eugenio Oyarzabal, Kasson, MN (US); Crystal Faye Springer, Marietta, GA (US); Nathan Gary Steffenhagen, Eau Claire, WI (US)

(73) Assignee: International Business Machines Corporation, Armonk, NY (US)

( * ) Notice: Subject to any disclaimer, the term of this patent is extended or adjusted under 35 U.S.C. 154(b) by 2441 days.

(21) Appl. No.: 10/787,641

(22) Filed: Feb. 26, 2004

(65) Prior Publication Data
US 2005/0193033 A1 Sep. 1, 2005

(51) Int. Cl.
*G06F 3/048* (2006.01)
(52) U.S. Cl. ......... 715/810; 715/845; 715/841; 715/828
(58) Field of Classification Search .................... 707/10; 709/223; 715/810, 845, 841, 828
See application file for complete search history.

(56) References Cited

U.S. PATENT DOCUMENTS

| 6,728,713 | B1 * | 4/2004 | Beach et al. | 1/1 |
|---|---|---|---|---|
| 7,003,560 | B1 * | 2/2006 | Mullen et al. | 709/223 |
| 2003/0212715 | A1 * | 11/2003 | Bangel et al. | 707/201 |
| 2004/0148370 | A1 * | 7/2004 | Sadiq | 709/223 |

\* cited by examiner

*Primary Examiner* — William Bashore
*Assistant Examiner* — Sherrod Keaton
(74) *Attorney, Agent, or Firm* — Patterson & Sheridan, LLP

(57) ABSTRACT

A method, system and article of manufacture for database management and, more particularly, for managing multiple information management tools in a data processing system. One embodiment provides a method of managing multiple information management tools in a data processing system. The method comprises displaying, on a display device, a user interface of a toolkit configured for managing the multiple information management tools, the user interface comprising a plurality of selectable operations applicable to information management tools, receiving a user selection of an operation of the plurality of selectable operations, and applying the selected operation to at least one of the information management tools.

11 Claims, 4 Drawing Sheets

SYSTEM AND METHOD FOR DATABASE MANAGEMENT

BACKGROUND OF THE INVENTION

1. Field of the Invention

The present invention generally relates to database management and, more particularly, to managing multiple information management tools in a data processing system.

2. Description of the Related Art

The creation of increasingly powerful computer (or computing) systems is accompanied by a continuously improved information technology (IT) infrastructure. The IT infrastructure is based on a multitude of different coexisting networks which are (or can be) interconnected. Examples of frequently implemented networks are local area networks (LAN), wide area networks (WAN) and virtual private networks (VPN). Each network can be configured to enable communication between a plurality of different computing systems. For instance, many networks include one or more server computers in communication with numerous client computers. Information can be shared between the one or more server computers and the client computers using information management systems. Such information management systems are frequently composed of a multiplicity of information management tools required for processing information. Such information management tools are software tools and include, for instance, tools for generating information, databases for storing the information and applications for exploiting the information.

Currently, a multiplicity of different information management tools is developed and sold by multiple software manufacturers. For instance, different database solutions are proposed, such as INTERNATIONAL BUSINESS MACHINES' (IBM) DB2, MICROSOFT SQL SERVER™ database product, and ORACLE™, SYBASE™, And COMPUTER ASSOCIATES™ database products. However, overall information management systems integrating plural information management tools are generally not available. An example of an overall information management system is a system that allows managing the complete communication, data transmission and data maintenance required for typical business workflows in today's companies. Such overall information management systems are generally customized solutions that are implemented by integrating information management tools from different vendors into one software environment according to company-specific requirements. In other words, only few operational overall information management systems are currently available for purchase. An example of a well-known overall information management system is the LOTUS NOTES™ information management system of INTERNATIONAL BUSINESS MACHINES™ of Armonk, N.Y.

Information management tools commonly include agents. As known in the art, agents are programs that perform functionalities or services over a network according to a defined scheduling. Under many customized information management system implementations it is common for each information management tool to include one or more agents for performing a specific functionality. One type of functionality which is frequently performed by agents is data replication or processing. For instance, business owners often desire that data stored within their network be copied or otherwise backed up to help minimize loss of data in the event that a server or client fails. To this extent, if a business owner desires that data stored on a particular (source) server be replicated to another (destination) server, the source server will generally include a "replication" agent that will carry out the replication process.

However, problems arise as the size of information management systems and the quantity of agents associated therewith begins to grow. Specifically, as more agents function, the potential for conflicts grows. For instance, simultaneous execution of plural different agents on a server may cause serious performance degradation on the server. Moreover, executing an agent (e.g., a replication agent) during a period of high end-user workload could cause a server process (e.g., replication) to malfunction. In addition, a particular functionality could require a specific sequence of agents to be executed which, if not followed, could result in data integrity problems. The current disparate nature in which agents are controlled often gives rise to such conflict issues. An additional problem with a high quantity of agents distributed across a growing network is the time and energy required to schedule the agents for execution. More specifically, agents are often scheduled at a local level so that if server "A" is to be replicated to server "B", an administrator/programmer must access server "A" to schedule the replication agent. As the network begins to grow, local scheduling could place unreasonable strain on business resources. To resolve this problem, co-pending U.S. patent application 20030212715, entitled "System, method and program product for centrally managing agents", filed Nov. 13, 2003, which is incorporated herein by reference, describes a control database of a control system for storing master agents which are scheduled to execute remote agents stored in remote databases of remote systems. Once executed by the master agents, the remote agents will implement functionalities thereto. By providing centralized management of agents in this manner, agent scheduling conflicts are prevented.

One difficulty when dealing with centrally controlled remote agents is that the remote agents are statically defined by the administrator/programmer. However, while the remote agents are statically defined, selection criteria for documents on which to operate may be of dynamic nature. For instance, assume an information management tool including a remote agent that is defined to archive (or replicate) all documents of a corresponding computing system that are in a "Completed" status. Assume further that a given user then requests that, from a given point of time on, only documents which are not older than two weeks should be archived. Thus, the remote agent must be modified manually by the administrator/programmer according to the requested change. In other words, for each support request the remote agent must be modified manually by the administrator/programmer so that it performs the correct operation on the correct set of documents. The manually modified remote agent may then be centrally invoked by the master agent. However, when responding to large numbers of requests per day, updating each function manually and, thus, managing the corresponding information management tools becomes inefficient.

Therefore, there is a need for an improved technique for managing multiple information management tools in a data processing system.

SUMMARY OF THE INVENTION

The present invention generally is directed to a method, system and article of manufacture for database management and, more particularly, for managing multiple information management tools in a data processing system.

One embodiment provides a method of managing multiple information management tools in a data processing system.

The method comprises displaying, on a display device, a user interface of a toolkit configured for managing the multiple information management tools, the user interface comprising a plurality of selectable operations applicable to information management tools; receiving a user selection of an operation of the plurality of selectable operations; and applying the selected operation to at least one of the information management tools.

Another embodiment provides a method of managing multiple databases in a data processing system. The method comprises displaying, on a display device, a first user interface screen of a toolkit configured for managing the multiple databases, the first user interface screen comprising a viewable representation of a plurality of selectable databases; receiving a user selection of a subset of databases from the plurality of selectable databases; displaying, on the display device, a second user interface screen of the toolkit, the second user interface screen comprising a viewable representation of a plurality of selectable operations applicable to databases; receiving a user selection of an operation of the plurality of selectable operations; and applying the selected operation to each database of the subset of databases.

Still another embodiment provides a computer readable medium containing a program which, when executed, performs a process of managing multiple information management tools in a data processing system. The process comprises displaying, on a display device, a user interface of a toolkit configured for managing the multiple information management tools, the user interface comprising a plurality of selectable operations applicable to information management tools; receiving a user selection of an operation of the plurality of selectable operations; and applying the selected operation to at least one of the information management tools.

Still another embodiment provides a computer readable medium containing a program which, when executed, performs a process of managing multiple databases in a data processing system. The process comprises displaying, on a display device, a first user interface screen of a toolkit configured for managing the multiple databases, the first user interface screen comprising a viewable representation of a plurality of selectable databases; receiving a user selection of a subset of databases from the plurality of selectable databases; displaying, on the display device, a second user interface screen of the toolkit, the second user interface screen comprising a viewable representation of a plurality of selectable operations applicable to databases; receiving a user selection of an operation of the plurality of selectable operations; and applying the selected operation to each database of the subset of databases.

Still another embodiment provides a data processing system comprising a display device configured for displaying a user interface comprising a plurality of selectable operations applicable to a plurality of information management tools; and a toolkit for managing multiple information management tools, the toolkit being configured for receiving, via the user interface, a user selection of an operation of the plurality of selectable operations; and applying the selected operation to at least one information management tool of the plurality of information management tools.

Still another embodiment provides a data processing system comprising a toolkit for managing multiple databases. The toolkit is configured for displaying a first user interface screen comprising a viewable representation of a plurality of selectable databases; displaying a second user interface screen comprising a viewable representation of a plurality of selectable operations applicable to databases; receiving, via the first user interface screen, a user selection of a subset of databases from the plurality of selectable databases; receiving, via the second user interface screen, a user selection of an operation of the plurality of selectable operations; and applying the selected operation to each database of the subset of databases.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS INTRODUCTION

Figure 1:
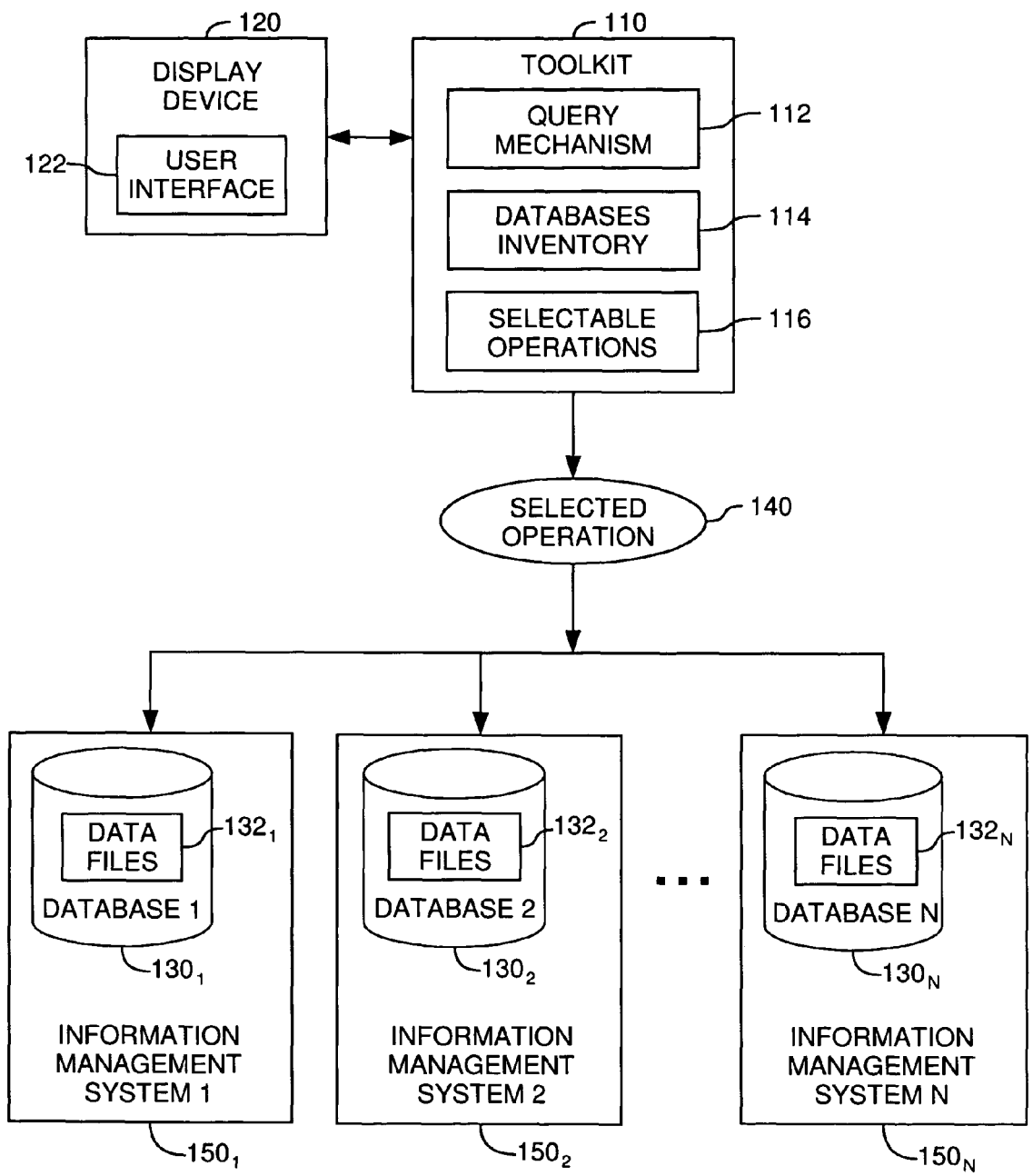
FIG. 1 is a data processing system illustratively utilized in accordance with the invention.

The present invention generally is directed to a system, method and article of manufacture for database management in a data processing system. According to one aspect, multiple databases, such as LOTUS NOTES™ databases, are managed. In one embodiment, a first and a second user interface screen of a toolkit configured for managing the multiple databases are displayed on a display device of the data processing system. The first user interface screen includes a viewable representation of a plurality of selectable databases. The second user interface screen includes a viewable representation of a plurality of selectable operations applicable to databases. Using the first user interface screen, a user can select all, or a subset of, the databases from the plurality of selectable databases. Using the second user interface screen, the user can select an operation of the plurality of selectable operations. The selected operation is applied by the toolkit to each database of the user-selected databases.

According to another aspect, multiple information management tools in a data processing system are managed. The multiple information management tools can be applications and/or databases which include at least one of a calendar function and an email function, such as available in the LOTUS NOTES™ platform. The data processing system includes a display device for displaying a user interface of a toolkit configured for managing the multiple information management tools. The user interface includes a plurality of selectable operations applicable to information management tools. Using the user interface, a user can select an operation of the plurality of selectable operations. The selected operation is applied by the toolkit to each of the information management tools.

It is noted that particular embodiments described herein may refer to managing specific information management tools. For example, embodiments may be described with reference to managing LOTUS NOTES™ databases. However, references to managing databases are merely for purposes of illustration and not limiting of the invention. Thus, it is broadly contemplated that managing databases may include managing any suitable information management tools such as, for instance, LOTUS NOTES™ applications and/or other suitable software products which may include, for instance, at least one of a calendar function and an email function.

Data Processing Environment

One embodiment of the invention is implemented as a program product for use with a computer system. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Embodiments of the invention can be implemented in a hardware/software configuration including at least one client computer and at least one server computer. The client(s) and server(s) may be executing on a common machine or may be deployed in distributed environment in which the client(s) and server(s) communicate via a network. However, the client-server model is merely one model in which the present invention may be implemented, and persons skilled in the art will recognize other possibilities. Furthermore, embodiments of the present invention can apply to any comparable hardware configuration, regardless of whether the computer systems are complicated, multi-user computing apparatus, single-user workstations, or network appliances that do not have non-volatile storage of their own. Further, it is understood that while reference is made to particular software products, including LOTUS NOTES™ applications and databases, the invention is not limited to a particular software product, standard or version. Accordingly, persons skilled in the art will recognize that the invention is adaptable to other software products and that the invention is also adaptable to future versions of a particular software product as well as to other suitable software products presently unknown.

Preferred Embodiments

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

Referring now to FIG. 1, a block diagram of one embodiment of a data processing system 100 is illustrated. The data processing system 100 illustratively includes a toolkit 110, a display device 120 and a plurality of information management systems $150_1$ to $150_N$ (three shown by way of example), collectively referred to as the information management systems 150. Each of the information management systems 150 may include one or more information management tools. The toolkit 110 is configured for managing the one or more information management tools.

In one embodiment, the information management tools managed from the toolkit 110 include databases. Illustratively, each of the information management systems $150_1$ to $150_N$ includes a database $130_1$ to $130_N$ (collectively referred to as the databases 130). As used herein, the term "database" may refer to any organized collection of data which may be accessed by an application. Specific examples include relational databases and hierarchical databases. The toolkit 110 and the databases 130 may reside on a common computer system implementing the data processing system 100. However, it should be noted that the data processing system 100 may be implemented according to various other configurations, which are also contemplated. For instance, the toolkit 110 and a portion of the databases 130 may reside on the first computer system and the remaining databases 130 may reside on other computer systems. Alternatively, the toolkit 110 may reside on the first computer system and all databases 130 may reside on one or more other computer systems.

The toolkit 110 includes a databases inventory 114 of the databases 130 which are managed by the toolkit 110. The toolkit 110 further includes selectable operations 116 which can be performed on the databases 130. According to one aspect, a user can select one or more databases from the databases inventory 114 and one or more operations from the selectable operations 116. Specifically, the user can select one or more operations to be performed on data files $132_1$, $132_2$, $132_N$ (collectively, data files 132) of the databases 130. Exemplary operations are copying or moving the data files 132 and/or documents from the data files 132, modifying the data files 132 and/or the documents and inserting data into or extracting data from the data files 132 and/or the documents. Illustratively, the user indicates a selected operation 140 to be performed on the selected database(s). The toolkit 110 further includes a query mechanism 112 for querying the databases 130. Using the query mechanism 112 the toolkit 110 can determine relevant data files 132 and/or documents from the data files 132 to be operated on.

More specifically, according to one aspect, a user interface 122 including a viewable representation of the databases inventory 114 is displayed on the display device 120. The user interface 122 is configured to allow user selection of one or more databases from the viewable representation of the databases inventory 114. Thus, using the user interface 122 the user can specify the selected database(s). Furthermore, the user interface 122 may include a viewable representation of the selectable operations 116 allowing user selection of one or more operations to be performed on the selected database(s). Thus, using the user interface 122 the user can specify the selected operation 140.

In one embodiment, the user interface 122 is a graphical user interface (GUI). The GUI may provide multiple different user interface screens, such as graphical windows, in a process for managing databases. For instance, the GUI may provide a separate window for each viewable representation. Accordingly, a first window can be used to display a list box for the databases inventory 114 and a second window can be used to display a list box for the selectable operations 116. According to predefined parameters, such as user preferences or system settings, the first and second windows can be displayed concurrently or sequentially. Furthermore, various graphical elements, such as icons, pushbuttons, pull-down menus, checkboxes, pop-up menus or pop-up windows can be used to support and/or guide a user throughout a process for managing the databases 130. According to one aspect, such graphical elements are used to guide the user in a step-wise manner through the process for managing the databases 130. An exemplary GUI and exemplary graphical elements provided by the toolkit 110 of FIG. 1 are explained in more detail below with reference to FIGS. 2-7.

Figure 2:
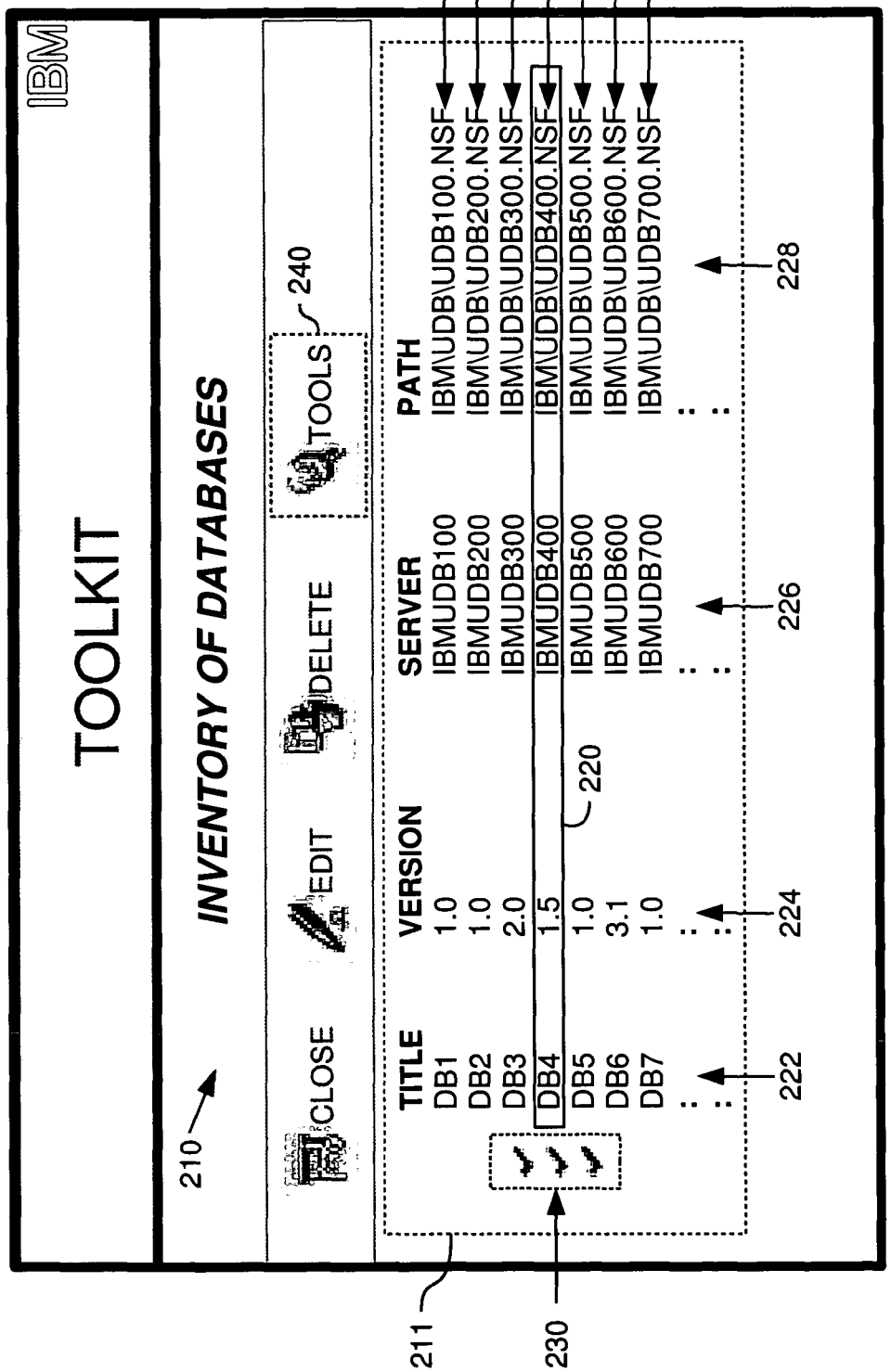
FIGS. 2-7 are screen shots illustrating management of multiple databases in one embodiment.

Referring now to FIG. 2, an exemplary GUI 200 including a viewable representation 210 of an inventory of databases (e.g., databases inventory 114 of FIG. 1) is shown. The GUI 200 is displayed on a display device (e.g., display device 120 of FIG. 1). Illustratively, the viewable representation 210 includes a list 211 of multiple databases. The list 211 includes a plurality of rows 212, 214, 215, 216, 217, 218, and 219, each identifying an associated database (e.g., one of databases $130_1$ to $130_N$ of FIG. 1). By way of example, each database is identified by a database title, a database version, a server identification of the server hosting the database and a corresponding path name. Exemplary database titles, database versions, server identifications and path names for the databases identified in rows 212, 214, 215, 216, 217, 218, 219 are illustrated in columns 222, 224, 226, and 228, respectively. However, it should be noted that any viewable representation of the databases which allows identification and user selection of one or more databases is broadly contemplated.

In one embodiment, the user can select one or more of the databases using a pointing device, such as a computer mouse. For instance, to select a given database "DB1"-"DB7", the user can click on the associated row 212, 214, 215, 216, 217, 218 or 219 using the pointing device. However, for the following explanations it should be assumed that the user may use any suitable input device for entering input and commands, such as a keyboard, a light pen or a human finger in the case of a touch screen, a stylus (e.g., in the case of a handheld computer or personal digital assistant) or any other suitable pointing device. When the associated row 212, 214, 215, 216, 217, 218 or 219 is selected, selection of the given database is confirmed by highlighting the associated row. By way of example, when the user selects the row 216 to select the database "DB4", the row 216 is highlighted (as schematically indicated by box 220).

Accordingly, the user can select one or more databases from the list 211. Each row 212, 214, 215, 216, 217, 218 or 219 of a selected database can be marked-up as selected, as indicated by checkmarks 230. By marking-up rows visual confirmation concerning the selected database(s) can be provided to the user. This may be helpful if a plurality of databases is to be selected.

When selection of database(s) is completed, the user can determine a functionality to be executed on the selected database(s). In one embodiment, determination of the functionality to be executed is performed by selecting an icon 240 "TOOLS". A screen shot 300 illustrating selection of the icon 240 "TOOLS" in one embodiment is shown in FIG. 3.

Figure 3:
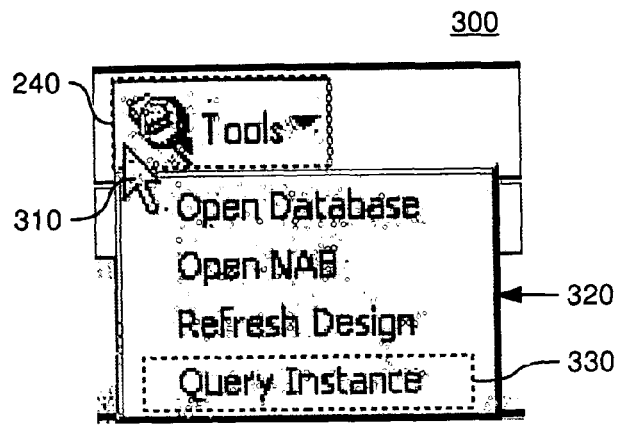
Figure 4:
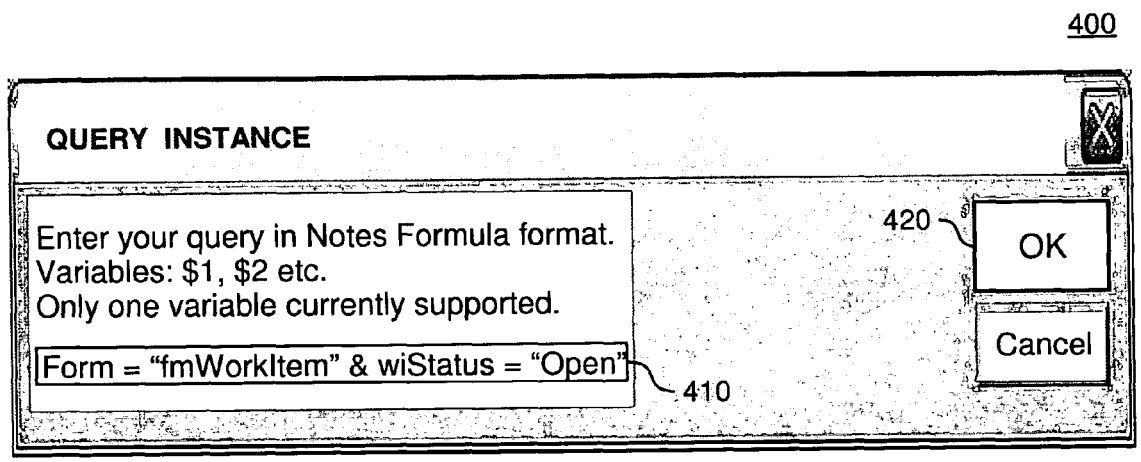

As illustrated in FIG. 3, the icon 240 "TOOLS" can be selected by positioning a mouse cursor 310 (also referred to herein as "mouse pointer") at a position over the icon 240 "TOOLS". It is assumed that the mouse cursor 310 is positioned over the icon 240 "TOOLS" in response to user manipulation of a pointing device, such as a computer mouse. When the mouse cursor 310 is detected at the position over the icon 240, a pop-up menu 320 is displayed on the display screen. Illustratively, the pop-up menu 320 displays a plurality of available functionalities, which can be executed on the selected database(s). By way of example, functionality 330 "Query Instance" can be invoked to query the selected database(s) in order to retrieve required data files (e.g., data files 132 of FIG. 1) and/or documents on which to operate. In one embodiment, when the functionality 330 "Query Instance" is invoked, a query pop-up window is displayed on the display screen which enables the user to input a corresponding query. FIG. 4 illustrates an exemplary query pop-up window 400.

As illustrated in FIG. 4, the exemplary query pop-up window 400 prompts the user to specify selection criteria defining a query for selection of the required data files and/or documents. In one embodiment, the user can input the selection criteria into a text box 410. By way of example, if the selected database(s) is(are) a LOTUS NOTES™ database(s), the selection criteria can be entered in LOTUS NOTES™ Formula Format. However, it should be noted that any suitable presently known or unknown selection criteria format is contemplated.

In the example illustrated in FIG. 4, the user enters as selection criteria "Form ="fmWorkItem" & wiStatus=Open" into the text box 410. In other words, the user requests retrieval of all documents from data files (e.g., data files 132 of FIG. 1) of the selected database(s) having a Form equal to "fmWorkItem" and a status equal to "Open". It should be noted that "fmWorkItem" is a Lotus Notes™ Form name which is only indicated by way of example.

Figure 5:
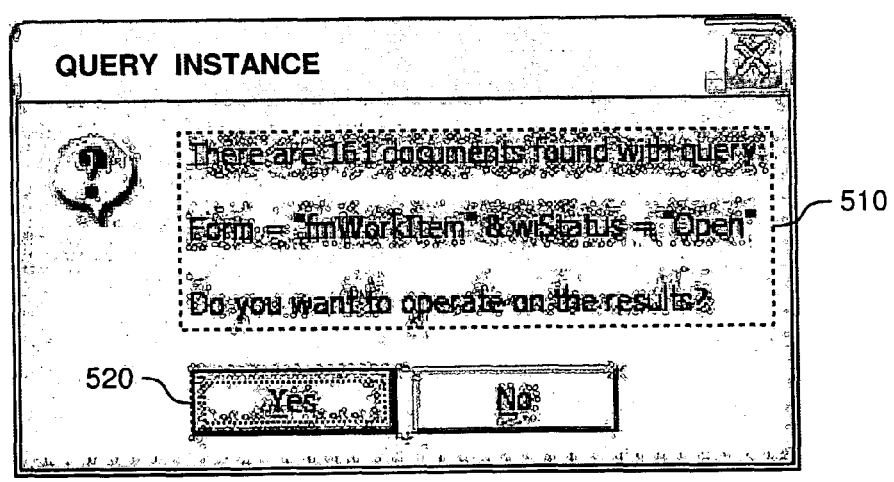

Upon entering the selection criteria, the user can click on a pushbutton 420 "OK" to indicate completion of selection criteria input. Thus, a query corresponding to the inputted selection criteria can be executed on the selected database(s) to determine the required data files and/or documents. Upon execution of the query, a confirmation pop-up window can be displayed on the display screen which requests user confirmation on whether to operate on the determined data files and/or documents. Such a confirmation pop-up window may provide feedback to the user about a current status of the process for managing the selected database(s). Furthermore, the confirmation pop-up window may request the user to indicate whether the process should be continued. However, it should be noted that display of such a confirmation pop-up window is merely optional. Instead of displaying the confirmation pop-up window, a selection pop-up window can directly be displayed which can be used to select one or more operations (e.g., selected operation 140 of FIG. 1) to be performed on the determined data files and/or documents. FIG. 5 illustrates an exemplary confirmation pop-up window 500 FIG. 6 illustrates an exemplary selection pop-up window 600.

As shown in FIG. 5, the exemplary confirmation pop-up window 500 illustratively includes exemplary text 510 which summarizes the executed query and obtained query results. The text 510 further includes a question on whether the user desires to operate on the determined data files and/or documents. If the user desires to operate on the determined data files and/or documents, (s)he may click on a pushbutton 520 to continue the process for managing the selected database(s). In this case, a selection pop-up window, such as the selection pop-up window 600 of FIG. 6 can be displayed which can be used to select one or more required operations for execution.

Figure 6:
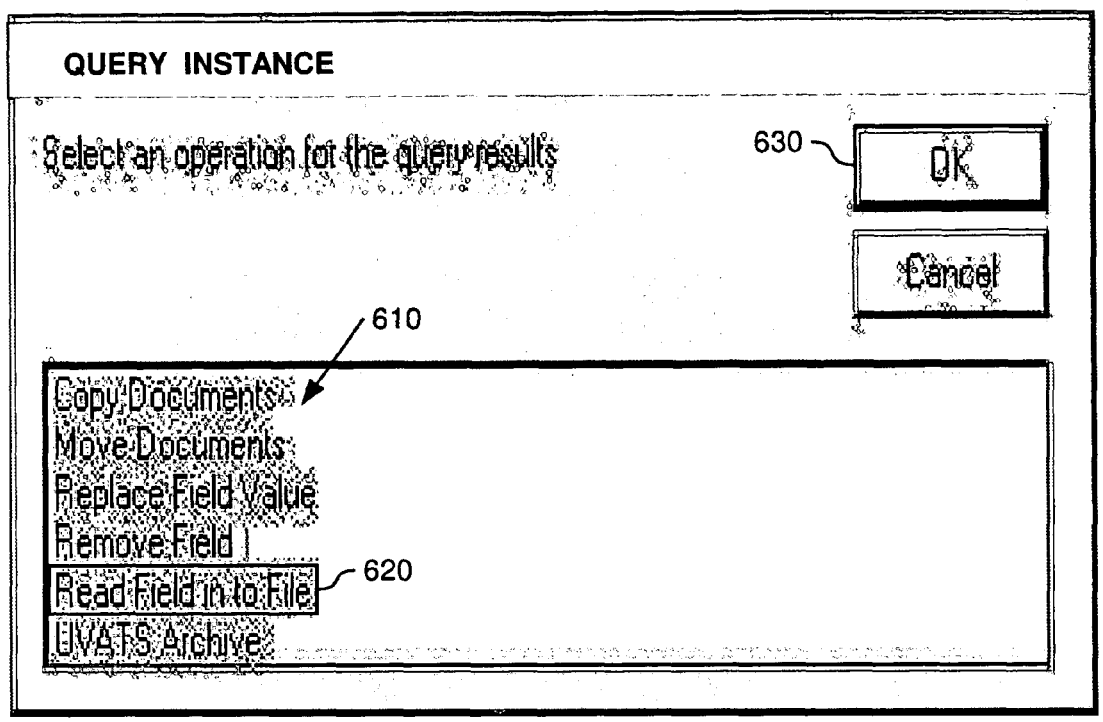

As shown in FIG. 6, the selection pop-up window 600 illustratively includes a list 610 of selectable operations (e.g., selectable operations 116 of FIG. 1). In order to select the required operation(s) from the list 610, the user can use the pointing device to position the mouse cursor over a given operation. If the user then clicks on the given operation, the given operation is selected. Illustratively, the user clicks on operation 620. The user repeats this process until all required operations have been selected. When selection of all required operations is completed, the user can click on a pushbutton 630 to initiate execution of the selected operation(s) on the determined data files and/or documents.

Figure 7:
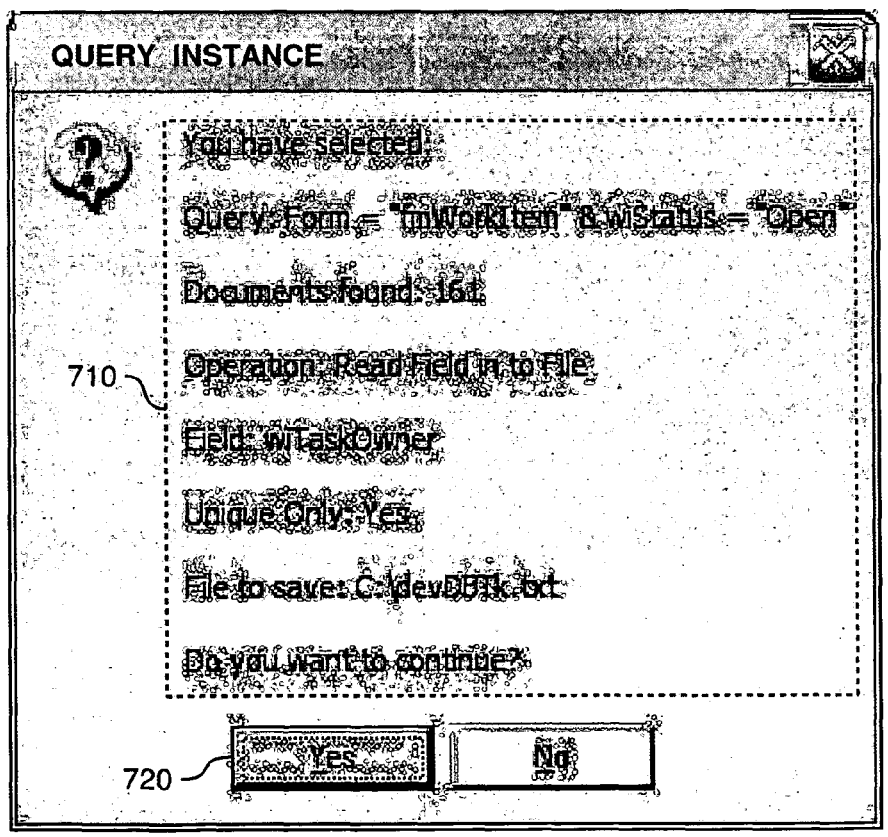

In one embodiment, before executing the selected operation(s), another confirmation pop-up window may provide feedback to the user about a current status of the process for managing the selected database(s). The other confirmation pop-up window may also request the user to indicate whether the process should be continued. However, it should be noted that display of such another confirmation pop-up window is merely optional. Accordingly, instead of displaying the other confirmation pop-up window, the selected operation(s) can immediately be performed on the determined data files and/or documents. A screen shot illustrating an exemplary other confirmation pop-up window 700 is shown in FIG. 7.

The exemplary pop-up window 700 includes exemplary text 710 which summarizes the executed query, obtained query results and the selected operation(s). The text 710 may include any other suitable information on the current status of the process. The text 710 further includes a question on whether the user desires to execute the selected operation(s) on the determined data files and/or documents. If the user desires to execute the selected operation(s) on the determined data files and/or documents, (s)he may click on a pushbutton 720 to complete the process for managing the selected database(s). Subsequently, the toolkit executes the selected operation(s) on the determined data files and/or documents.

In various embodiments, the invention provides numerous advantages over the prior art. For instance, administration and support of multiple information management tools, such as LOTUS NOTES™ applications and/or databases, can be performed from one central location, i.e., the toolkit. In one embodiment, this central location allows application support team members to remotely maintain databases. Thus, mass changes to documents within a database as well as refreshing database designs can be automated for multiple database instances even if they are housed on different servers. All selected operations are performed from within the central location rather than being executed separately in each database instance.

More specifically, the toolkit provides a centralized area to store selectable operations used on a variety of information management tools, such as databases. Operations ranging from very specific to generic can be stored in the toolkit along with an inventory of databases each support team member administers. Exemplary selectable operations are (i) tracking changes to database designs, (ii) propagating design changes across multiple deployed database instances in one step, (iii) querying single or multiple databases from one location, (iv) operating on results of a query with a few simple mouse clicks (e.g., archiving or deleting selected documents, change document field values, etc.), (v) tracking tips, tricks and lessons learned, and (vi) managing and opening name and address books related to databases recorded in the toolkit without having to search for corresponding icons on a display device. It should be noted that custom operations can be added by individual users as necessary. Furthermore, in one embodiment, any of the selectable operations can be performed against any of the databases stored within the toolkit. Document selections are made dynamically without requiring changes to code (such as agents). In other words, a user simply needs to provide appropriate selection criteria in formula format for a pertinent request in order to query the selected database(s) through the toolkit. However, there is no need for the user to open the selected database(s) as all functionality is provided by the toolkit itself. In other words, all operations performed on the selected database(s) using the toolkit are stored in the toolkit. Storing all code executed by the toolkit in the toolkit itself has the advantage that it is easier and faster to implement new operations. Furthermore, maintenance cost of existing operations is significantly reduced. Using the toolkit as central location eliminates the need to deploy and manage the same code on numerous deployed databases. More specifically, as the code is entirely resident on the toolkit itself, development of the code is simplified as only common code at the central location needs to be developed instead of distinct codes deployed on numerous databases. The common code can be used on multiple existing and future databases. Moreover, a toolkit user may have authorization to create the common code to be performed on the deployed databases without having particular access rights to a given database. Accordingly, by limiting access to the deployed databases, security can be improved. Furthermore, maintenance of the common code can be performed more efficiently as only the common code at the central location needs to be maintained instead of distinct codes on multiple deployed databases. Moreover, when supporting multiple databases, not having to find an appropriate database icon on the display device and to open the corresponding database significantly reduces the time required to perform the selected operation(s).

While the foregoing is directed to embodiments of the present invention, other and further embodiments of the invention may be devised without departing from the basic scope thereof, and the scope thereof is determined by the claims that follow.

What is claimed is:

1. A method of managing multiple databases in a data processing system, comprising:
displaying, on a display device, a first user interface screen configured for managing the multiple databases, the first user interface screen comprising a viewable representation of a plurality of selectable databases;
receiving a user selection of a subset of databases from the plurality of selectable databases;
displaying, on the display device, a second user interface screen, the second user interface screen comprising a viewable representation of a plurality of selectable operations applicable to the databases;
receiving a user selection of an operation of the plurality of selectable operations;
executing a master agent configured to determine a preferred sequence to execute one or more local agents and to invoke the execution of one or more local agents in the preferred sequence, wherein the local agents perform the selected operation to each database of the subset of databases.

2. The method of claim 1, wherein the selected operation is one of an operation for querying each database of the subset of databases and an operation for modifying a database design of each database of the subset of databases.

3. The method of claim 1, wherein the subset of databases comprises a multiplicity of documents, the method further comprising:
   receiving a query suitable for identifying a subset of documents from the multiplicity of documents; and
   identifying the subset of documents; and
   wherein applying the selected operation includes applying the selected operation only to each document of the identified subset of documents.

4. The method of claim 1, wherein the master agent resides on a first computer and each of the multiple databases resides on one or more second computers connected to the first computer via a network.

5. The method of claim 1, wherein each of the multiple databases comprises at least one of a calendar function and an email function.

6. A computer readable storage medium containing a program which, when executed, performs a process of managing multiple databases in a data processing system, the process comprising:
   displaying, on a display device, a first user interface screen configured for managing the multiple databases, the first user interface screen comprising a viewable representation of a plurality of selectable databases;
   receiving a user selection of a subset of databases from the plurality of selectable databases;
   displaying, on the display device, a second user interface screen, the second user interface screen comprising a viewable representation of a plurality of selectable operations applicable to the databases;
   receiving a user selection of an operation of the plurality of selectable operations; and
   executing a master agent configured to determine a preferred sequence to execute one or more local agents and to invoke, in the preferred sequence, the execution of the one or more local agents, wherein the local agents perform the selected operation to each database of the subset of databases.

7. The computer readable storage medium of claim 6, wherein the selected operation is one of an operation for querying each database of the subset of databases and an operation for modifying a database design of each database of the subset of databases.

8. The computer readable storage medium of claim 6, wherein the subset of databases comprises a multiplicity of documents, the process further comprising:
   receiving a query suitable for identifying a subset of documents from the multiplicity of documents; and
   identifying the subset of documents; and
   wherein applying the selected operation includes applying the selected operation only to each document of the identified subset of documents.

9. The computer readable storage medium of claim 6, wherein the master agent resides on a first computer and each of the multiple databases resides on one or more second computers connected to the first computer via a network.

10. The computer readable storage medium of claim 6, wherein each of the multiple databases comprises at least one of a calendar function and an email function.

11. A data processing system, comprising:
    a processor; and
    a memory containing a program, which when executed on the processor performs an operation for managing multiple databases, the program being configured for:
        displaying a first user interface screen comprising a viewable representation of a plurality of selectable databases;
        displaying a second user interface screen comprising a viewable representation of a plurality of selectable operations applicable to the databases; and
        receiving, via the first user interface screen, a user selection of a subset of databases from the plurality of selectable databases;
        receiving, via the second user interface screen, a user selection of an operation of the plurality of selectable operations; and
        executing a master agent configured to determine a sequence of execution for one or more local agents and to invoke each of the one or more local agents, wherein the local agents apply the selected operations to each database of the subset of databases, in the determined sequence.

* * * * *